US012800767B2

(12) United States Patent
Takaki

(10) Patent No.: US 12,800,767 B2
(45) Date of Patent: Nov. 17, 2026

(54) OBJECT RECOGNITION DEVICE

(71) Applicant: DENSO CORPORATION, Kariya-city (JP)

(72) Inventor: Masanari Takaki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 1075 days.

(21) Appl. No.: 17/930,979

(22) Filed: Sep. 9, 2022

(65) Prior Publication Data

US 2023/0003892 A1 Jan. 5, 2023

Related U.S. Application Data

(63) Continuation of application No. PCT/JP2021/008187, filed on Mar. 3, 2021.

(30) Foreign Application Priority Data

Mar. 10, 2020 (JP) ................................ 2020-041095

(51) Int. Cl.
*G01S 17/89* (2020.01)

(52) U.S. Cl.
CPC .................................. *G01S 17/89* (2013.01)

(58) Field of Classification Search
CPC ....... G01S 17/89; G01S 7/4802; G01S 17/931
See application file for complete search history.

(56) References Cited

U.S. PATENT DOCUMENTS

| | | | | |
|---|---|---|---|---|
| 6,323,802 | B1 * | 11/2001 | Tokoro | G01S 13/931 342/70 |
| 2003/0179129 | A1 * | 9/2003 | Tamatsu | G01S 13/582 342/107 |
| 2017/0261602 | A1 * | 9/2017 | Olshansky | G01S 7/411 |
| 2019/0004166 | A1 * | 1/2019 | Orlowski | G01S 13/726 |
| 2019/0293793 | A1 | 9/2019 | Okuya | |
| 2020/0047748 | A1 * | 2/2020 | Komori | B60W 30/09 |
| 2021/0104027 | A1 * | 4/2021 | Longman | G01S 13/726 |

FOREIGN PATENT DOCUMENTS

| | | | | |
|---|---|---|---|---|
| EP | 3299841 | A1 * | 3/2018 | G01S 13/931 |
| JP | 2012052838 | A * | 3/2012 | |
| JP | 5320880 | B2 * | 10/2013 | |
| JP | 2014119285 | A * | 6/2014 | |
| JP | 6561869 | B2 * | 8/2019 | |

* cited by examiner

*Primary Examiner* — Isam A Alsomiri
*Assistant Examiner* — Benjamin Wade Clouser
(74) *Attorney, Agent, or Firm* — Precision Patents, P.C.

(57) ABSTRACT

An object recognition device includes a recognition unit and an object determination unit. The object determination unit includes a detection unit, an estimation unit, and a pseudo-determination unit. The estimation unit assumes that a shielding object is a vehicle and estimates a length of a side surface of the shielding object based on the width of the shielding object. The pseudo-determination unit determines whether a candidate object is a pseudo-object by using the length of the side surface. The pseudo-determination unit determines that the candidate object is the pseudo-object, if it is determined that transmission waves radiated in a direction in which the candidate object is located are reflected from the side surface and if another object is recognized at a location apart from a reflection point in a reflection direction by the same distance as a distance from the reflection point to the candidate object.

5 Claims, 7 Drawing Sheets

OBJECT RECOGNITION DEVICE

CROSS-REFERENCE TO RELATED APPLICATION

The present application is based on and claims the benefit of priority from earlier Japanese Patent Application No. 2020-41095 filed on Mar. 10, 2020, the description of which is incorporated herein by reference.

BACKGROUND

Technical Field

The present disclosure relates to an object recognition device.

Related Art

An object recognition device is known which recognizes an object based on reflected waves of radiated electromagnetic waves.

SUMMARY

An aspect of the present disclosure provides an object recognition device, including: a recognition unit configured to radiate transmission waves in a plurality of radiation directions and receive reflected waves of the transmission waves to recognize objects; and an object determination unit configured to determine whether a candidate object, which is one of the objects recognized by the recognition unit, is a pseudo-object erroneously recognized due to the transmission waves reflected from a side surface of a shielding object, which is present on a near side of the candidate object.

The object determination unit includes: a detection unit configured to detect a width of the shielding object; an estimation unit configured to assume that the shielding object is a vehicle and estimate a length of the side surface of the shielding object based on the width of the shielding object detected by the detection unit; and a pseudo-determination unit configured to determine whether the candidate object is the pseudo-object by using the length of the side surface of the shielding object estimated by the estimation unit.

The pseudo-determination unit is configured to determine that the candidate object is the pseudo-object, if it is determined that the transmission waves radiated in a direction in which the candidate object is located are reflected from the side surface of the shielding object and if another object is recognized at a location apart from a reflection point in a reflection direction by the same distance as a distance from the reflection point to the candidate object.

DETAILED DESCRIPTION OF THE PREFERRED EMBODIMENTS

An object recognition device is known which recognizes an object based on reflected waves of radiated electromagnetic waves.

As disclosed in JP 2014-119285 A, this kind of object recognition device may erroneously recognize an object due to a multipath phenomenon. For example, when the radiated electromagnetic waves are reflected from a side surface of an object and are thereafter reflected from another object, and are then received as reflected waves, it is erroneously recognized that an object is present in the radiation direction of the electromagnetic waves in which the object is not present actually.

To determine whether the recognized object is an object erroneously recognized due to a multipath phenomenon, a technique can be considered which is for determining whether electromagnetic waves radiated in the direction in which the object is located have been reflected from a side surface of a shielding object, which is present on the near side of the erroneously recognized object, and another object is present in the reflection direction. However, as a result of detailed studies by the inventor, a problem was found that since the length the side surface of the shielding object may not be appropriately detected due to, for example, a positional relationship between the shielding object and a vehicle in which the object recognition device is installed, the determination technique described above may not be able to appropriately determine whether the recognized object is an object erroneously recognized due to a multipath phenomenon.

An aspect of the present disclosure provides an object recognition device that can determine whether a recognized object is an object erroneously recognized due to a multipath phenomenon even when a length of a side surface of a shielding object cannot be appropriately detected.

Hereinafter, exemplary embodiments of the present disclosure will be described with reference to the drawings.

1. Configuration

Figure 1:
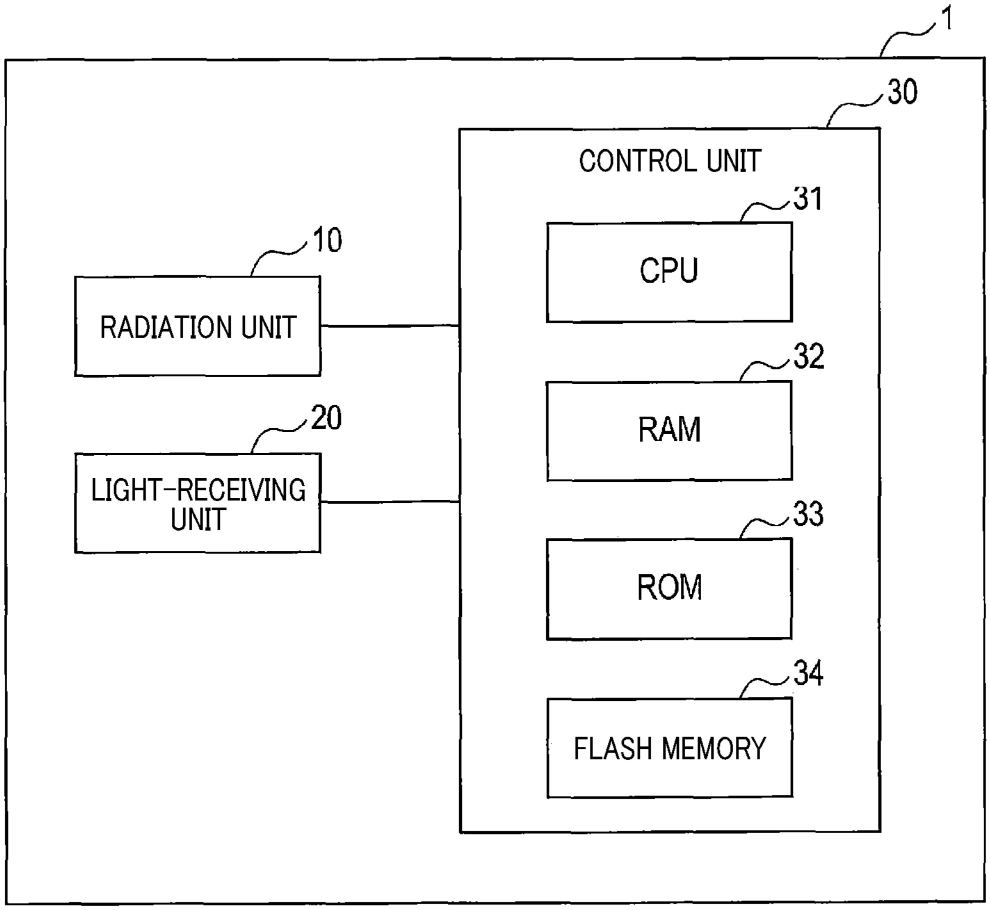
FIG. 1 is a block diagram illustrating a configuration of a lidar device.

A lidar device 1 illustrated in FIG. 1 radiates laser light (transmission waves) and receives reflected light (reflected waves) thereof to recognize an object. The lidar device 1 is, for example, installed in a vehicle and is used for recognizing various objects present around the vehicle. Hereinafter, the vehicle in which the lidar device 1 is installed is referred to as an own vehicle. Lidar is also written as LIDAR. LIDAR is an abbreviation for Light Detection and Ranging.

As illustrated in FIG. 1, the lidar device 1 includes a radiation unit 10, a light-receiving unit 20, and a control unit 30.

The radiation unit 10 radiates laser light to a predetermined radiation region based on an instruction from the control unit 30. The radiation region extends ahead of the vehicle in a predetermined angular range in the horizontal direction and the perpendicular direction. The radiation unit 10 radiates laser light to a plurality of radiation divisions obtained by dividing the radiation region in the horizontal direction and the perpendicular direction to radiate the laser light to the whole of the radiation region.

The light-receiving unit 20 receives the reflected light of the laser light radiated from the radiation unit 10. The light-receiving unit 20 converts the received reflected light into an electrical signal and outputs the electrical signal to the control unit 30.

The control unit 30 is mainly configured by a well-known microcomputer including a CPU 31, a RAM 32, a ROM 33, and a flash memory 34. Functions of the control unit 30 are implemented by executing a program stored in a non-transitory tangible storage medium. In this example, the ROM 33 corresponds to the non-transitory tangible storage medium. Executing the program implements a method corresponding to the program. The control unit 30 may include one microcomputer or a plurality of microcomputers.

2. Processing

Figure 2:
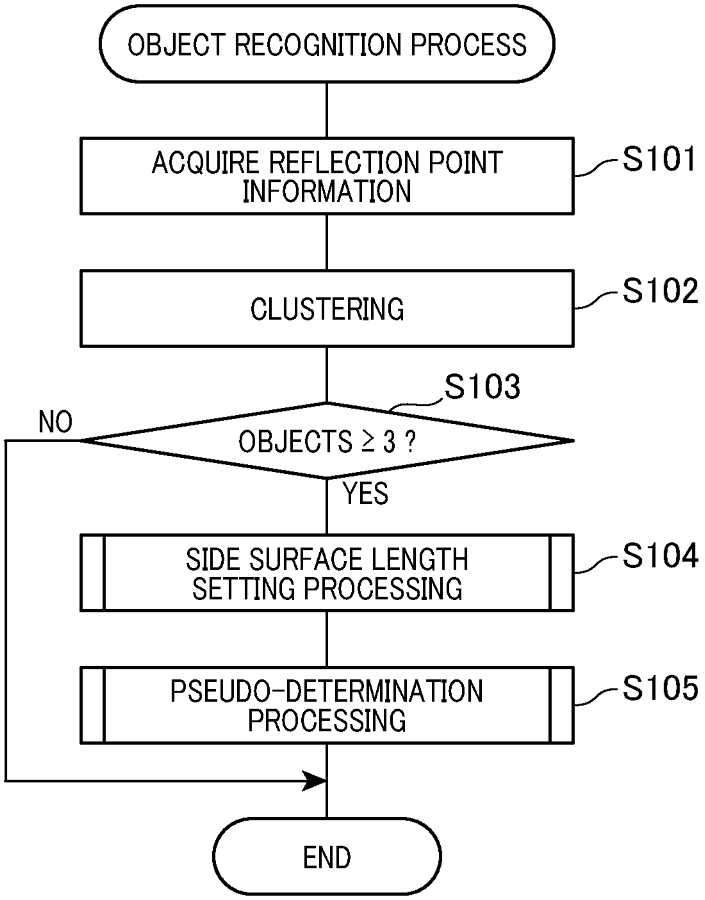
FIG. 2 is a flowchart of an object recognition process.

Next, an object recognition process performed by the CPU 31 of the control unit 30 will be described with reference to a flowchart illustrated in FIG. 2. On termination of scanning with laser light in one cycle, the CPU 31 starts the object recognition process. The termination of scanning with laser light in one cycle indicates that radiation of laser light by the radiation unit 10 to the whole of the radiation region is completed.

First, in S101, the CPU 31 acquires reflection point information. The reflection point information includes information indicating a reflection point, which is a point from which laser light is reflected, for example, information indicating a direction of radiation of the laser light related to the reflection point and a distance from the lidar device 1 to the reflection point. In S101, the CPU 31 acquires reflection point information on all reflection points acquired by scanning with laser light in one cycle.

Next, in S102, the CPU 31 performs clustering for all the reflection points based on the reflection point information acquired in S101 to form a cluster point group, and recognizes the formed cluster point group as an object.

Then, in S103, the CPU 31 determines whether the number of the objects recognized in S102 is three or more. In S103, if determining that the number of the objects recognized in S102 is not three or more, that is, if determining that the number of the recognized objects is two or less, the CPU 31 terminates the object recognition process.

In contrast, in S103, if determining that the number of the objects recognized in S102 is three or more, the CPU 31 proceeds to S104 to perform side surface length setting processing. The side surface length setting processing sets, as described later in detail, a length of the side surface of each of the objects recognized in S102.

Next, in S105, the CPU 31 performs pseudo-determination processing. The pseudo-determination processing determines, as described later in detail, whether each of the objects recognized in S102 is a pseudo-object due to a multipath phenomenon. The pseudo-object due to a multipath phenomenon is an object erroneously recognized in S102 due to laser light reflected from a side surface of another object present at a location nearer the lidar device 1.

On termination of S105, the CPU 31 terminates the object recognition process.

Figure 3:
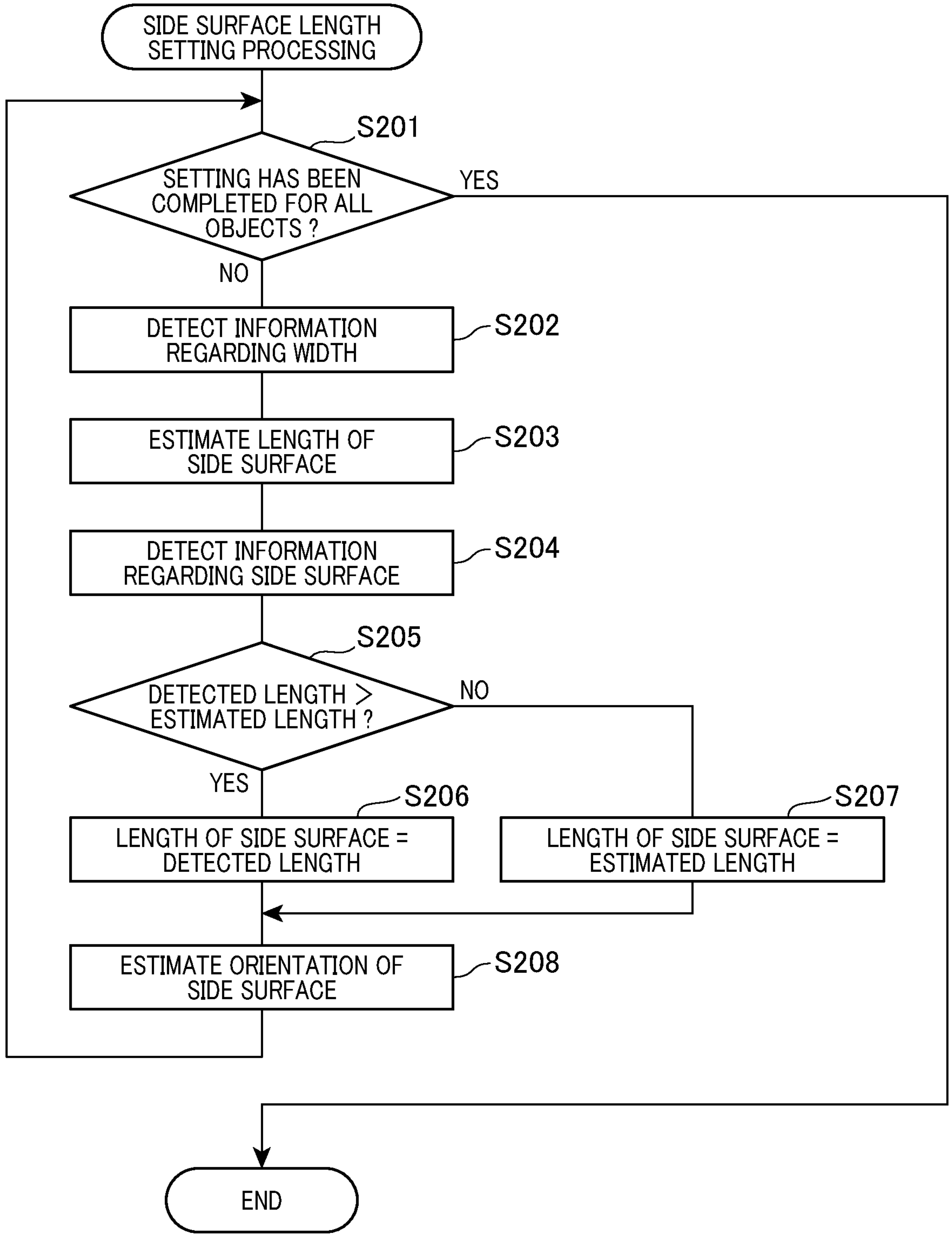
FIG. 3 is a flowchart of side surface length setting processing of the object recognition process.

Next, the side surface length setting processing of the object recognition process will be described with reference to a flowchart illustrated in FIG. 3.

First, in S201, the CPU 31 performs processing from S202 to S208 described later for all the objects recognized in S102 to determine whether a length of a side surface has been set. If determining that a length of a side surface has been set for all the objects in S201, the CPU 31 terminates the side surface length setting processing.

In contrast, if determining that a length of a side surface is not set for all the objects in S201, that is, there is an object for which a length of a side surface is not set yet, the CPU 31 proceeds to S202.

In S202, the CPU 31 selects, as a target object, one object for which a length of a side surface is not set yet, from among the plurality of objects recognized in S102. Then, the CPU 31 detects information regarding the width of the target object based on reflection points belonging to the cluster point group of the target object. Specifically, in the present embodiment, the CPU 31 detects the width of the target object as information regarding the width of the target object, that is, the length of the target object in the width direction. The CPU 31 may employ, as a detection value of the width of the target object, for example, the following values (a) to (c). (a) A width of the target object detected from a result of scanning in one cycle, a so-called instantaneous value. (b) An average value obtained by averaging the widths of the target object detected from respective results of scanning in a plurality of cycles. (c) The maximum value among widths of the target object detected from results of scanning in a plurality of cycles. In the present embodiment, the CPU 31 employs the average value in the above (b) as a detection value of the width of the target object.

Next, in S203, the CPU 31 estimates the length of a side surface of the target object in a case in which the target object is assumed to be a vehicle, based on the width of the target object detected in S202.

Specifically, the CPU 31 checks the width of the target object detected in S202 against a table previously stored in the flash memory 34 to estimate the length of the side surface of the target object. The table previously stored in the flash memory 34 indicates a relationship between a vehicle width and a vehicle length. For each classified vehicle, a vehicle width and a vehicle length are defined. For example, a small-sized passenger vehicle has a vehicle width of approximately 1.4 m and a vehicle length of approximately 3.4 m. For example, a standard-sized passenger vehicle has a vehicle width of approximately 1.8 m and a vehicle length of approximately 4.8 m. For example, a truck has a vehicle width of approximately 2.5 m and a vehicle length of approximately 10 m. The flash memory 34 stores, for example, a table indicating a relationship between a vehicle width and a vehicle length, such that when the vehicle width is shorter than 1.5 m, the corresponding vehicle length is 3.4 m, when the vehicle width is 1.5 m or longer and shorter than 2.1 m, the corresponding vehicle length is 4.8 m, and when the vehicle width is 2.1 m or longer, the corresponding vehicle length is 10 m. The CPU 31 assumes that the target object is a vehicle and checks the table against the width of the target object detected in S202 to estimate the length of the side surface of the target object corresponding to the vehicle length. Hereinafter, the length of the side surface of the target object estimated in S203 is also referred to as an estimated length.

Next, in S204, the CPU 31 detects information regarding the side surface of the target object based on reflection points belonging to the cluster point group of the target object.

Specifically, in the present embodiment, the CPU 31 detects the length of the side surface of the target object as information regarding the side surface of the target object.

Whether the length of the side surface of the target object can be appropriately detected depends on the positional relationship between the target object and the own vehicle or the like. For example, when the target object is located diagonally in front of the own vehicle, laser light is easily reflected from the side surface of the target object. Hence, the length of the side surface of the target object can be appropriately detected. In contrast, for example, when the target object is located directly in front of the own vehicle, laser light is rarely reflected from the side surface of the target object. Hence, the length of the side surface of the target object is difficult to appropriately detect. As described above, since there is a case in which the length of the side surface of the target object can be appropriately detected and a case in which the length of the side surface of the target object is difficult to appropriately detect, detection values of the length of the side surface of the target object may vary.

Thus, in the present embodiment, the maximum value among the lengths of the side surface of the target object detected from respective results of scanning in a plurality of cycles is employed as a detection value of the length of the side surface of the target object. By employing the maximum value, pseudo-determination processing described later in detail is performed on condition that a multipath phenomenon is easily caused, whereby erroneous recognition of an object due to a multipath phenomenon is not easily overlooked. This is because although a multipath phenomenon is likely to occur when the radiated laser light is reflected from the side surface of the target object, it can be considered that as the side surface of the target object is longer, the side surface is more highly likely to reflect the radiated laser light. Hereinafter, the length of the side surface of the target object detected in S204 is also referred to as a detected length.

Next, in S205, the CPU 31 determines whether the detected length is longer than the estimated length.

If determining that the detected length is longer than the estimated length in S205, the CPU 31 proceeds to S206 and sets the detected length as a length of the side surface of the target object.

In contrast, if determining that the detected length is not longer than the estimated length in S205, that is, the detected length is equal to or shorter than the estimated length, the CPU 31 proceeds to S207 and sets the detected length as a length of the side surface of the target object.

In S208, the CPU 31 estimates an orientation of the side surface of the target object. Specifically, in the present embodiment, the CPU 31 estimates, as an orientation of the side surface of the target object, a moving direction of the target object, that is, a traveling direction of the target object when the target object is assumed to be a vehicle. The moving direction of the target object is calculated from change with time of a location of the target object with respect to the own vehicle.

On termination of S208, the CPU 31 returns the process to S201.

Figure 5:
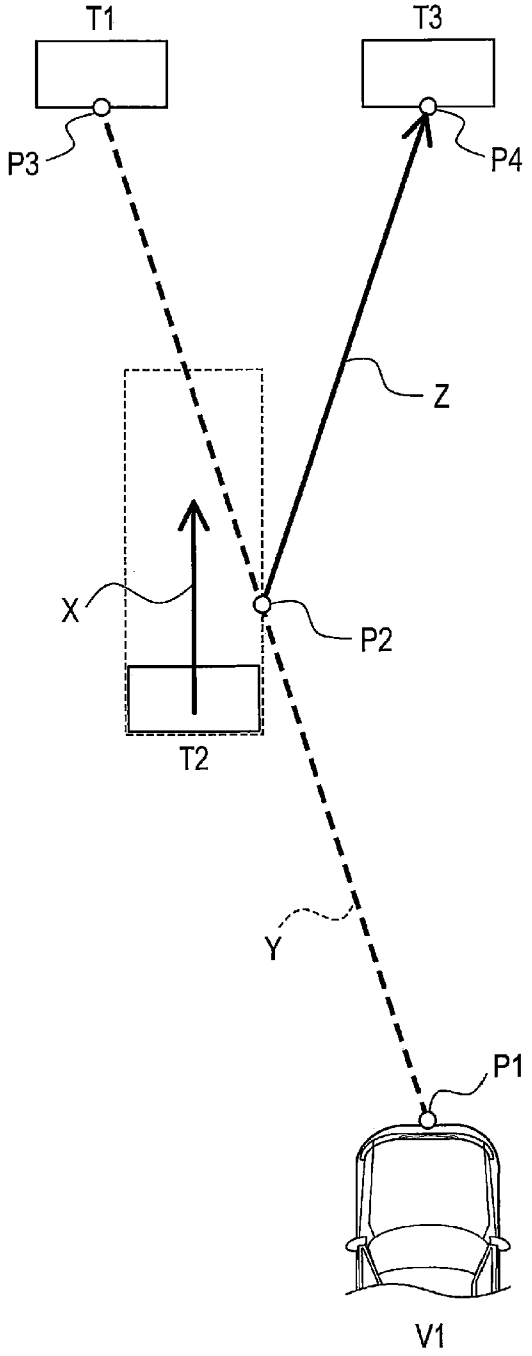
FIG. 5 is a schematic diagram illustrating an example in which an own vehicle and objects recognized by the object recognition process are viewed from above.
Figure 6:
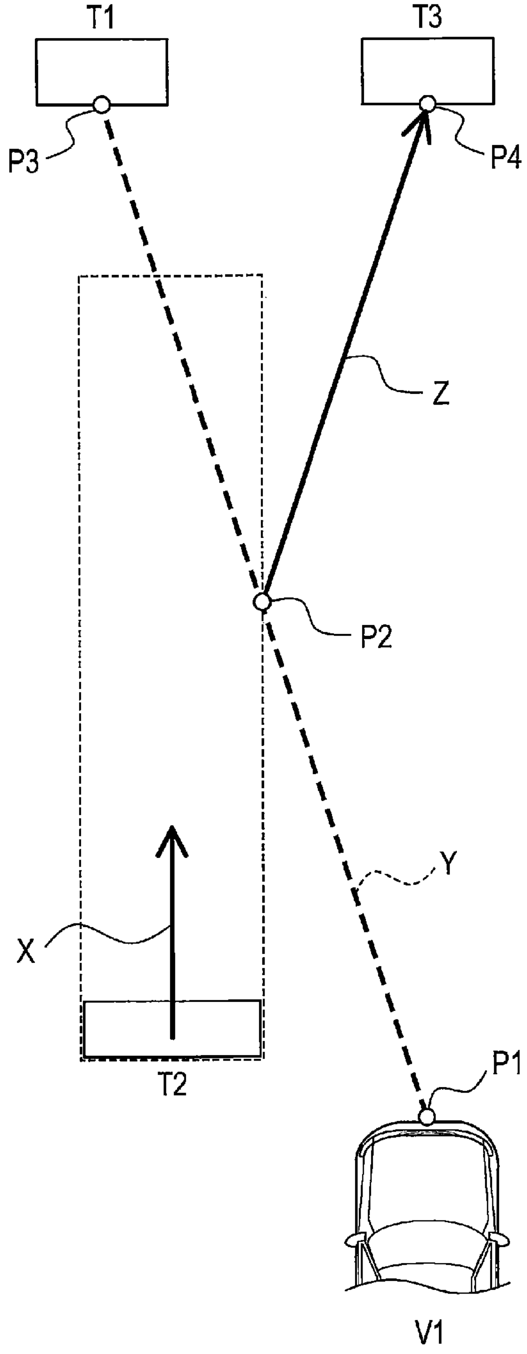
FIG. 6 is a schematic diagram illustrating another example in which an own vehicle and objects recognized by the object recognition process are viewed from above.
Figure 7:
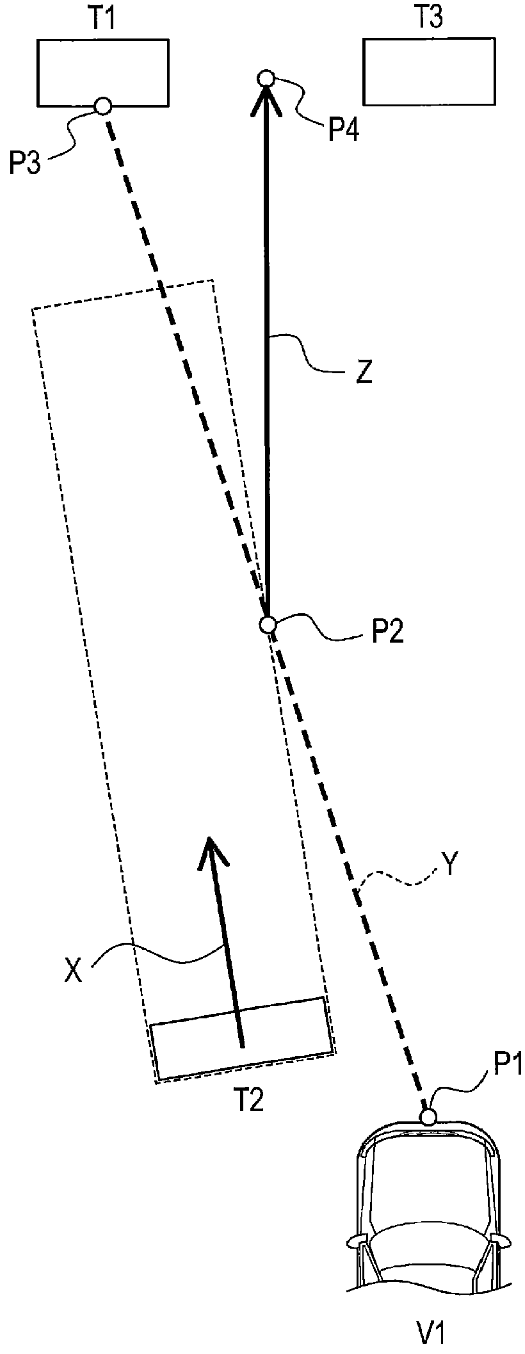
FIG. 7 is a schematic diagram illustrating still another example in which an own vehicle and objects recognized by the object recognition process are viewed from above.

Next, pseudo-determination processing of the object recognition process will be described with reference to a flowchart illustrated in FIG. 4 and schematic diagrams illustrated in FIG. 5 to FIG. 7. FIG. 5 to FIG. 7 are schematic diagrams illustrating examples of locations of the own vehicle and recognized three objects viewed from above when the objects are recognized in S102. In FIG. 5 to FIG. 7, the own vehicle is denoted by vehicle V1, and the recognized three objects are respectively denoted by object T1, object T2, and object T3. Each of the objects is indicated by a solid-line rectangle The pseudo-determination processing determines whether the recognized object is a pseudo-object due to a multipath phenomenon. This determination is performed on a two-dimensional plane on which the own vehicle and the recognized object are projected when viewed from above.

First, in S301 illustrated in FIG. 4, the CPU 31 performs processing of S302 to S304 described later for all the objects recognized in S102 to determine whether the determination whether the recognized object is a pseudo-object due to a multipath phenomenon has been completed. If determining that, for all the recognized objects, the determination whether the recognized object is a pseudo-object has been completed in S301, the CPU 31 terminates the pseudo-determination processing.

In contrast, if determining that, for all the recognized objects, the determination whether the recognized object is a pseudo-object has not been not completed in S301, that is, if determining that there is a recognized object for which the determination whether the recognized object is a pseudo-object is not yet completed, the CPU 31 proceeds to S302.

In S302, the CPU 31 selects, as a candidate object, one object for which the determination whether the recognized object is a pseudo-object is not yet completed, among the plurality of objects recognized in S102. Then, the CPU 31 determines whether the laser light radiated in the direction, in which the candidate object is located, has been reflected from a side surface of another object.

Specifically, the CPU 31 first determines whether another object is present between the candidate object and the own vehicle. In examples illustrated in FIG. 5 to FIG. 7, for example, if object T1 is selected as the candidate object, it is determined that object T2 is present between vehicle V1 and object T1. Hereinafter, another object determined to be present between the candidate object and the own vehicle is also referred to as a shielding object.

If determining that a shielding object is present, the CPU 31 next determines, on a two-dimensional plane on which the own vehicle and the recognized object are projected when viewed from above, assuming that the shielding object has a rectangular shape having a side surface having a length set by the side surface length setting processing and an orientation estimated by the side surface length setting processing, whether the side surface on the own vehicle side of the shielding object intersects a straight line connecting the candidate object and the own vehicle. The straight line connecting the candidate object and the own vehicle is a straight line connecting one point of the candidate object and a reference point predetermined in the lidar device 1 installed in the own vehicle. In FIG. 5 to FIG. 7, point P3 is one point of the object T1. Point P1 is the reference point of the lidar device 1 installed in vehicle V1. Broken line Y connecting point P1 and point P3 corresponds to the above straight line. Arrow X in FIG. 5 to FIG. 7 indicates a traveling direction of object T2, and a solid-line rectangle is a shape assuming object T2.

One point of the candidate object may be, for example, one of a plurality of reflection points belonging a cluster point group recognized as the candidate object, a center point of reflection points selected from among the plurality of reflection points, or a center point of all the reflection points. The CPU 31 may determine whether the straight line connecting the candidate object and the own vehicle intersects the side surface on the own vehicle side of the shielding object, based on one point of the candidate object, or whether straight lines connecting respective plurality of points of the candidate object and the own vehicle intersect the side surface on the own vehicle side of the shielding object. In the latter case, the CPU 31 may determine that the straight lines intersect the side surface on the own vehicle side of the shielding object, if at least one of the straight lines intersects the side surface on the own vehicle side of the shielding object, or if a predetermined number or more of the straight lines intersect the side surface on the own vehicle side of the shielding object. If determining that the straight line connecting the candidate object and the own vehicle intersects the side surface on the own vehicle side of the shielding object, the CPU 31 determines that the laser light radiated in the direction, in which the candidate object is located, has been reflected from the side surface of the shielding object. In the examples illustrated in FIG. 5 to FIG. 7, since the side surface on the vehicle V1 side of object T2 intersects broken line Y at point P2, it is determined that the laser light radiated in the direction, in which object T1 is located, has been reflected from the side surface of object T2.

Returning back to FIG. 4, in S302, if determining that the laser light radiated in the direction, in which the candidate object is located, has not been reflected from the side surface of the shielding object, the CPU 31 returns the process to S301.

In contrast, in S302, if determining that the laser light radiated in the direction, in which the candidate object is located, has been reflected from the side surface of the shielding object, the CPU 31 proceeds to S303.

In S303, the CPU 31 determines whether an object other than the shielding object is present at a real image position. The real image position is apart from a reflection position on the side surface of the shielding object in the reflection direction by the same distance as a distance from the reflection position to the candidate object. The reflection position on the side surface of the shielding object is a reflection position of laser light on the side surface of the shielding object determined, in S302, to reflect the laser light radiated in the direction in which the shielding object is located. In FIG. 5 to FIG. 7, point P2 corresponds to the reflection position. The reflection direction is a direction in which the laser light reflected from the reflection position travels in a straight line.

In FIG. 5 to FIG. 7, the direction indicated by arrow Z corresponds to the reflection direction. Point P4 corresponds to the real image position. That is, in FIG. 5 to FIG. 7, the distance from point P2 to point P3 and the distance from point P2 to point P4 are equal. In S303 illustrated in FIG. 4, for example, the CPU 31 may determine that an object related to a cluster point group is present at the real image position when at least one of reflection points belonging to the cluster point group is located within a predetermined radius centering on the real image position. In the examples illustrated in FIG. 5 to FIG. 6, since object T3 is present at point P4, it is determined that an object other than the shielding object is present at the real image position. In the example illustrated in FIG. 7, since no object is present at point P4, it is determined that no object is present at the real image position.

Returning back to FIG. 4, in S303, if determining that no other object is present at the real image position, the CPU 31 returns the process to S301.

In contrast, in S303, if determining that another object is present at the real image position, the CPU 31 proceeds to S304.

In S304, the CPU 31 determines that the candidate object is a pseudo-object due to a multipath phenomenon and cancels the recognition for the candidate object. In the examples illustrated in FIG. 5 and FIG. 6, the recognition for object T1 is canceled.

Figure 4:
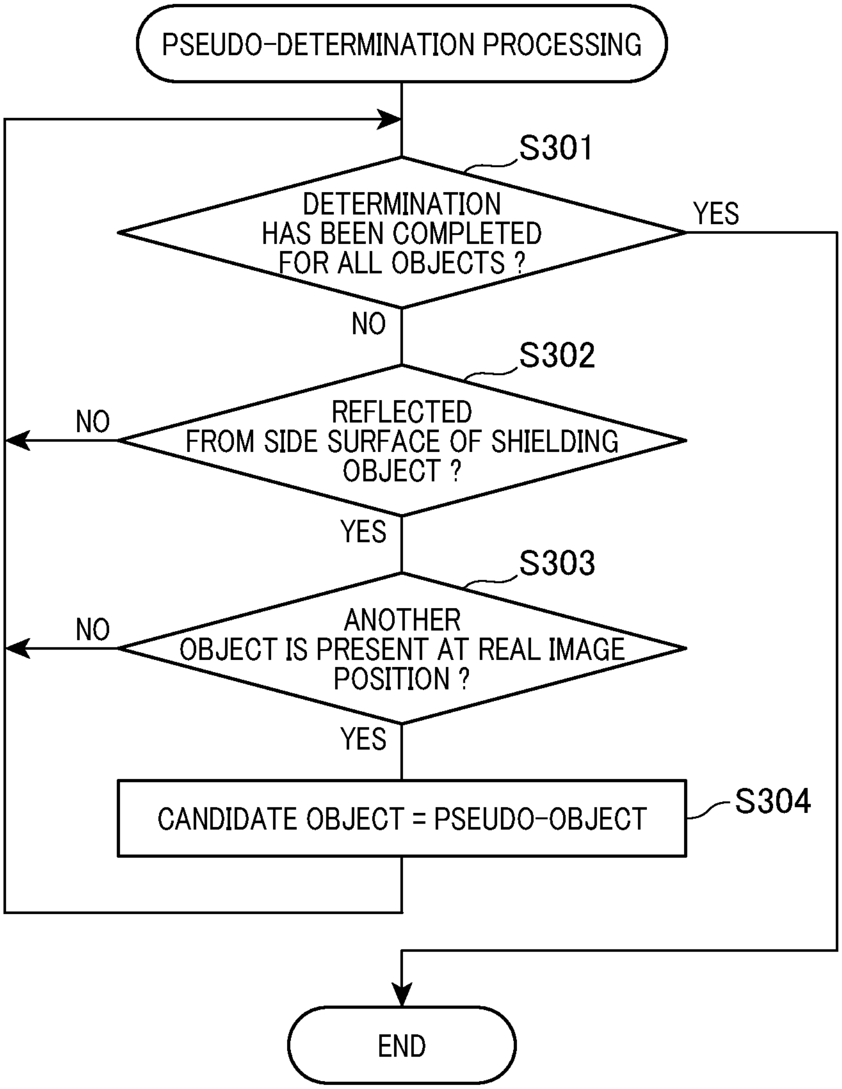
FIG. 4 is a flowchart of pseudo-determination processing of the object recognition process.

On termination of S304 illustrated in FIG. 4, the CPU 31 returns the process to S301.

3. Effects

According to the embodiment described above in detail, the following effects are provided.

(3a) The lidar device 1 is configured to assume that a shielding object is a vehicle and estimate a length of a side surface of the shielding object based on the width of the shielding object. The lidar device 1 is configured to use the estimated length of the side surface of the shielding object to determine whether a candidate object is a pseudo-object. The lidar device 1 is configured to determine that the candidate object is a pseudo-object, if determining that laser light radiated in the direction, in which the candidate object is located, has been reflected from the side surface of the shielding object, and having recognized another object at a location apart from a reflection position in the reflection direction by the same distance as a distance from the reflection position to the candidate object.

According to the configuration described above, even when the length of the side surface of the shielding object cannot be appropriately detected, it can be determined whether the recognized object is an object erroneously recognized due to a multipath phenomenon.

(3b) The lidar device 1 is further configured to estimate an orientation of the side surface of the shielding object. The lidar device 1 is configured to use the estimated length and orientation of the side surface of the shielding object to determine whether the candidate object is a pseudo-object.

According to the configuration described above, the reflection direction of laser light can be estimated more appropriately. Hence, it can be determined more appropriately whether the recognized object is an object erroneously recognized due to a multipath phenomenon.

(3c) The lidar device 1 is further configured to estimate that the traveling direction of the shielding object is the orientation of the side surface of the target object. In addition, the lidar device 1 is configured to use the estimated length and orientation of the side surface of the shielding object to determine whether the candidate object is a pseudo-object.

According to the configuration described above, the reflection direction of laser light can be estimated more appropriately. Hence, it can be determined more appropriately whether the recognized object is an object erroneously recognized due to a multipath phenomenon.

(3d) The lidar device 1 is further configured to detect a length of the side surface of the shielding object. The lidar device 1 is configured to use any one of the detected length of the side surface of the shielding object and the estimated length of the side surface of the shielding object to determine whether the candidate object is a pseudo-object.

According to the configuration described above, it can be more appropriately determined whether laser light radiated in the direction, in which the candidate object is located, has been reflected from a side surface of another object. Hence, it can be determined more appropriately whether the recognized object is an object erroneously recognized due to a multipath phenomenon.

4. Other Embodiments

The present disclosure is not limited to the above embodiment and can be variously modified.

(4a) In the above embodiment, in S204 of the side surface length setting processing, the CPU 31 detects, as information regarding a side surface of a target object, a length of the side surface of the target object, based on reflection points belonging to a cluster point group of the target object. However, the CPU 31 may further detect a longitudinal direction of the side surface of the target object as information regarding the side surface of the target object. If detecting the longitudinal direction of the side surface of the target object as information regarding the side surface of the target object, in S208 of the side surface length setting processing, the CPU 31 may estimate the longitudinal direction of the side surface of the detected target object as an orientation of the side surface of the target object. By employing the above estimation method, for example, even when the target object is a stationary body, specifically, even when the target object is a roadside object such as a side wall, the orientation of the side surface of the target object can be estimated.

(4b) In the above embodiment, in S202 of the side surface length setting processing, the CPU 31 detects a width of the target object as information regarding the width of the target object, based on reflection points belonging to the cluster point group of the target object. However, the CPU 31 may further detect a width direction of the target object as the information regarding the width of the target object. When a width direction of the target object is detected as the information regarding the width of the target object, in S208 of the side surface length setting processing, the CPU 31 may estimate the direction perpendicular to the width direction of the detected target object as an orientation of the side surface of the target object. By employing the above estimation method, for example, even when the target object is a stationary body, the orientation of the side surface can be estimated. In addition, for example, even when a longitudinal direction of the side surface of the target object is difficult to appropriately detect for the same reason as that, as described above, when a length of the side surface of the target object is difficult to appropriately detect, the orientation of the side surface of the target object can be estimated.

(4c) In the above embodiment, in S204 of the side surface length setting processing, the CPU 31 employs, as a detection value of the length of the side surface of the target object, the maximum value among the lengths of the side surface of the target object detected from respective results of scanning in a plurality of cycles. However, the CPU 31 may employ, as a detection value of the length of the side surface of the target object, for example, the length of the side surface of the target object detected from a result of scanning in one cycle, a so-called instantaneous value. The CPU 31 may employ, as a detection value of the length of the side surface of the target object, for example, an average value obtained by averaging lengths of the side surface of the target object detected from respective results of scanning in a plurality of cycles.

(4d) In the above embodiment, in S205 to S207 of the side surface length setting processing, the CPU 31 employs, as a set value of the length of the side surface of the target object, the longer one of the estimated length and the detected length. However, the CPU 31 may employ, as a set value of the length of the side surface of the target object, for example, the shorter length. By employing the shorter length, the recognized object can be prevented from being erroneously determined as a pseudo-object due to a multipath phenomenon.

(4e) In the above embodiment, in the side surface length setting processing, the CPU 31 estimates a length and an orientation of the side surface of each of the recognized objects. In the side surface length setting processing, the CPU 31 may not estimate a length and an orientation of the side surface of all of the recognized objects. For example, the CPU 31 may estimate a length and an orientation of the side surface of only another object determined to be present between the candidate object and the own vehicle, that is, a shielding object.

(4f) In the above embodiment, when the pseudo-determination processing is terminated, the CPU 31 terminates the object recognition process. However, for example, the CPU 31 may execute the pseudo-determination processing again by using the orientation of the side surface estimated by a different method. The CPU 31 may execute the pseudo-determination processing repeatedly, for example, three times or more. Specifically, for example, as the estimated orientation of the side surface of the shielding object, the CPU 31 may employ a moving direction of the shielding object for a first time, a longitudinal direction of the side surface of the shielding object for a second time, and a direction perpendicular to the width direction of the shielding object for a third time to repeatedly execute the pseudo-determination processing.

In this case, in the pseudo-determination processing that has been executed multiple times, if determining that the recognized object is a pseudo-object due to a multipath phenomenon at least one time, the CPU 31 may determine that the object is a pseudo-object. By employing such a determination method, a pseudo-object due to a multipath phenomenon is difficult to overlook. In the pseudo-determination processing that has been executed multiple times, if determining that the same object is a pseudo-object due to a multipath phenomenon a predetermined number of times, for example, two or more times, the CPU 31 may determine that the object is a pseudo-object. By employing such a determination method, the recognized object can be prevented from being erroneously determined as a pseudo-object due to a multipath phenomenon.

(4g) Functions of one component in the above embodiment may be decentralized to a plurality of components, or functions of a plurality of components may be integrated into one component. Furthermore, part of the configuration of the above embodiment may be omitted. Furthermore, at least part of the configuration of the above embodiment may be added to or replaced by another configuration of the above embodiment.

In the above embodiment, S101 to S102 correspond to processing as a recognition unit, and S104 to S105 correspond to processing as an object determination unit.

An aspect of the present disclosure provides an object recognition device, including: a recognition unit configured to radiate transmission waves in a plurality of radiation directions and receive reflected waves of the transmission waves to recognize objects; and an object determination unit configured to determine whether a candidate object, which is one of the objects recognized by the recognition unit, is a pseudo-object erroneously recognized due to the transmission waves reflected from a side surface of a shielding object, which is present on a near side of the candidate object.

The object determination unit includes: a detection unit (31, S104, S202) configured to detect a width of the shielding object; an estimation unit (31, S104, S203) configured to assume that the shielding object is a vehicle and estimate a length of the side surface of the shielding object based on the width of the shielding object detected by the detection unit; and a pseudo-determination unit (31, S105, S302, S303, S304) configured to determine whether the candidate object is the pseudo-object by using the length of the side surface of the shielding object estimated by the estimation unit.

The pseudo-determination unit is configured to determine that the candidate object is the pseudo-object, if it is determined that the transmission waves radiated in a direction in which the candidate object is located are reflected from the side surface of the shielding object and if another object is recognized at a location apart from a reflection point in a reflection direction by the same distance as a distance from the reflection point to the candidate object.

According to the above configuration, it can be determined whether a recognized object is an object erroneously recognized due to a multipath phenomenon even when a length of a side surface of a shielding object cannot be appropriately detected.

What is claimed is:

1. An object recognition device, comprising:

a recognition unit configured to radiate transmission waves in a plurality of radiation directions and receive reflected waves of the transmission waves to recognize objects; and an object determination unit configured to determine whether a candidate object, which is one of the objects recognized by the recognition unit, is a pseudo-object erroneously recognized due to the transmission waves reflected from a side surface of a shielding object, which is present on a near side of the candidate object, wherein the object determination unit includes:

a detection unit configured to detect a width of the shielding object;

an estimation unit configured to assume that the shielding object is a vehicle and estimate a length of the side surface of the shielding object based on the width of the shielding object detected by the detection unit; and a pseudo-determination unit configured to determine whether the candidate object is the pseudo-object by using the length of the side surface of the shielding object estimated by the estimation unit, wherein the pseudo-determination unit is configured to:

estimate a length of the side surface of the shielding object based on the detected width of the shielding object;

detect a length of the side surface of the shielding object;

assume that the shielding object has a rectangular shape having a side surface having a length which is a longer one of the estimated length and the detected length;

determine that the transmission waves radiated in a direction in which the candidate object is located are reflected from the side surface of the shielding object for a state in which the side surface of the shielding object having the estimated length intersects a straight line connecting the candidate object and the vehicle viewed from above; and determine that the candidate object is the pseudo-object, for a state in which it is determined that the transmission waves radiated in a direction in which the candidate object is located are reflected from the side surface of the shielding object, the side surface being the nearer one to the object recognition device among two side surfaces of the rectangular, and for a state in which another object is recognized at a location apart from a reflection point in a reflection direction by the same distance as a distance from the reflection point to the candidate object.

2. The object recognition device according to claim 1, wherein the estimation unit is further configured to estimate an orientation of the side surface of the shielding object, and the pseudo-determination unit determines whether the candidate object is the pseudo-object by using the length and the orientation of the side surface of the shielding object estimated by the estimation unit.

3. The object recognition device according to claim 1, wherein the estimation unit is further configured to estimate a moving direction of the shielding object to be an orientation of the side surface of the shielding object, and the pseudo-determination unit determines whether the candidate object is the pseudo-object by using the length and the orientation of the side surface of the shielding object estimated by the estimation unit.

4. The object recognition device according to claim 1, wherein the detection unit is further configured to detect a longitudinal direction of the side surface of the shielding object, the estimation unit is further configured to estimate the longitudinal direction of the side surface of the shielding object detected by the detection unit to be an orientation of the side surface of the shielding object, and the pseudo-determination unit determines whether the candidate object is the pseudo-object by using the length and the orientation of the side surface of the shielding object estimated by the estimation unit.

5. The object recognition device according to claim 1, wherein the detection unit is further configured to detect a width direction of the shielding object, the estimation unit is further configured to estimate a direction perpendicular to the width direction of the shielding object detected by the detection unit to be an orientation of the side surface of the shielding object, and the pseudo-determination unit determines whether the candidate object is the pseudo-object by using the length and the orientation of the side surface of the shielding object estimated by the estimation unit.

* * * * *